Figure 1:
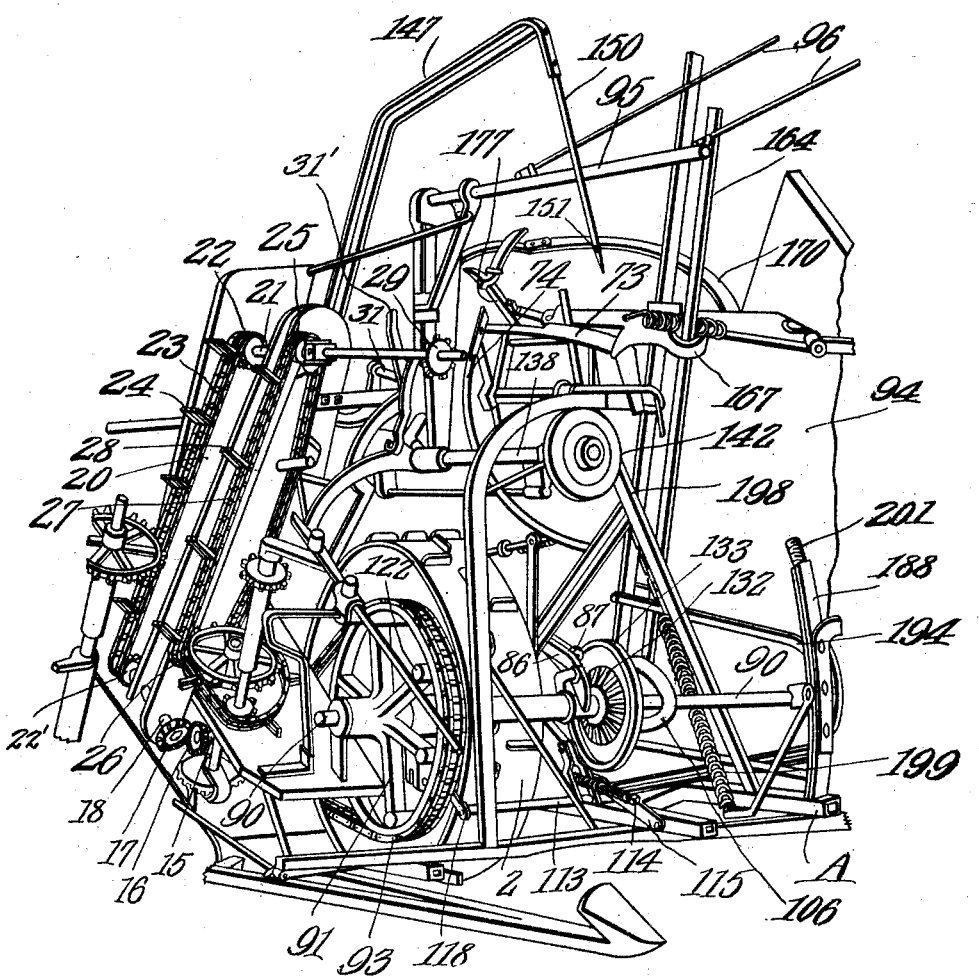

W. R. McHILL.
SHOCKING MACHINE.
APPLICATION FILED APR. 24, 1909.

1,081,247.

Patented Dec. 9, 1913.
8 SHEETS—SHEET 1.

Witnesses

Inventor,
William R. McHill,
By C. A. Snow & Co.
Attorneys

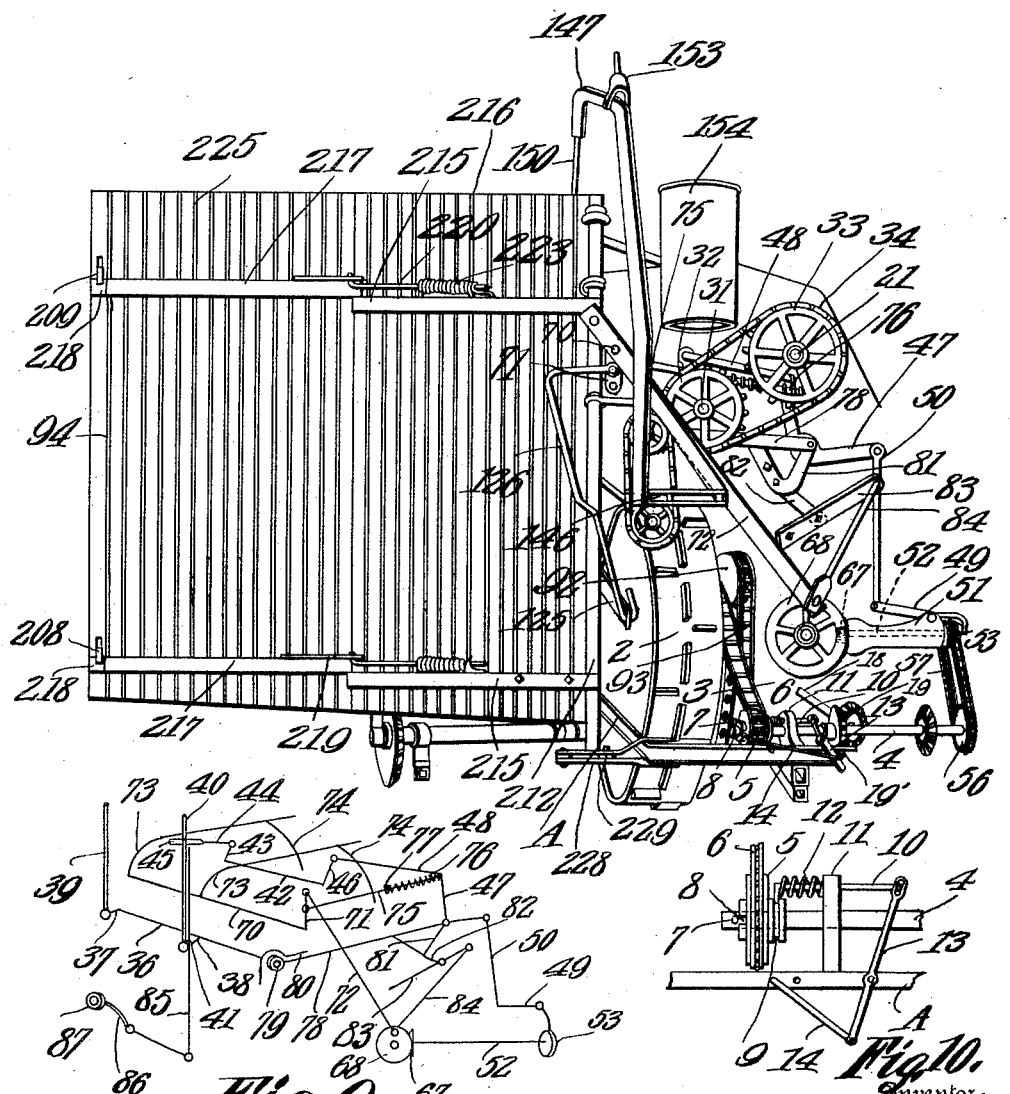

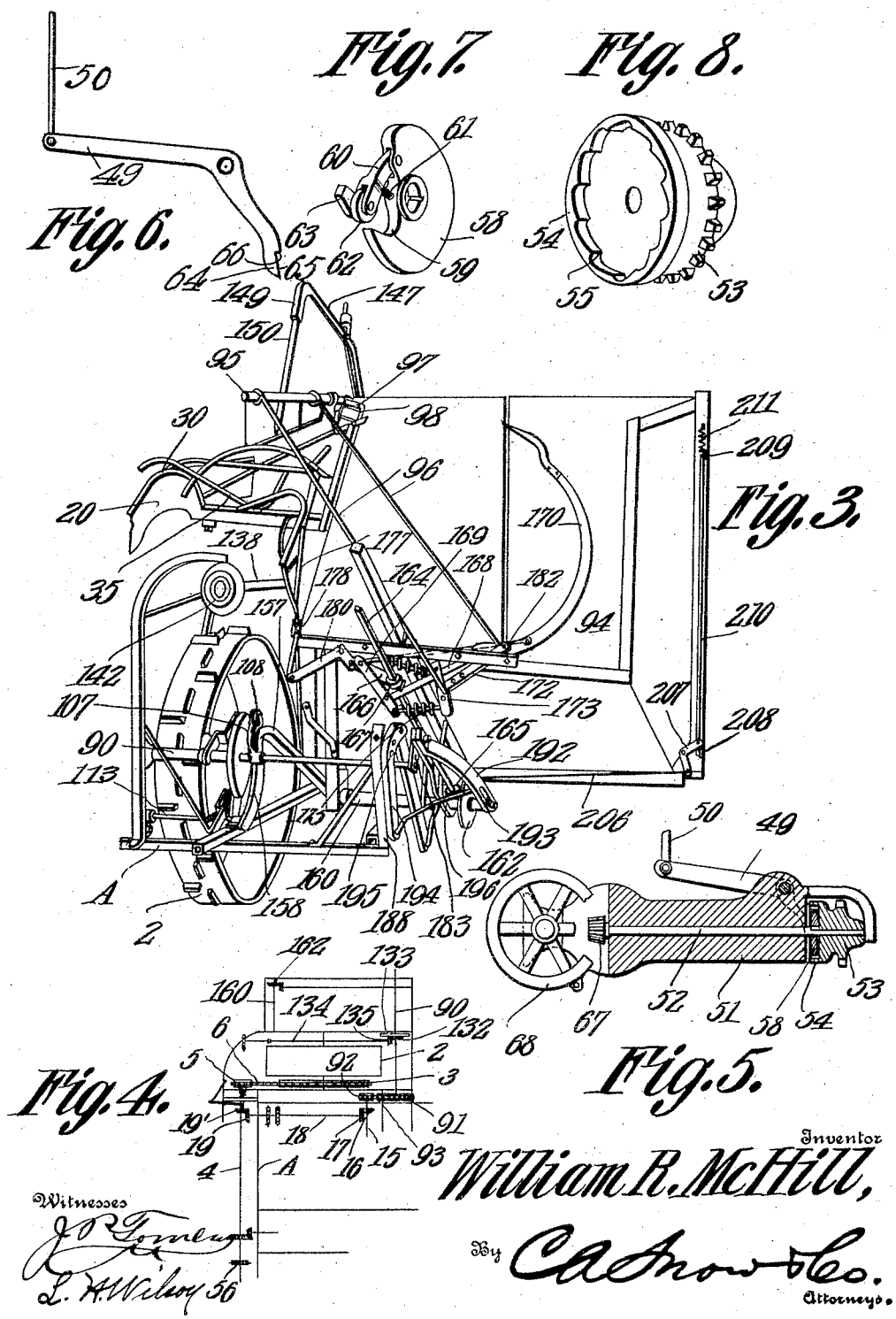

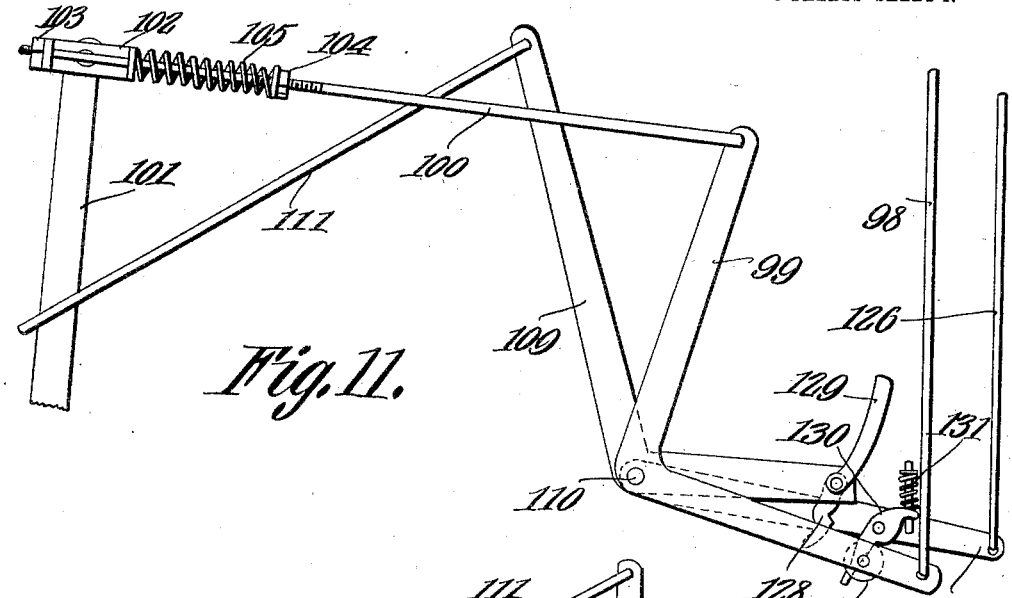

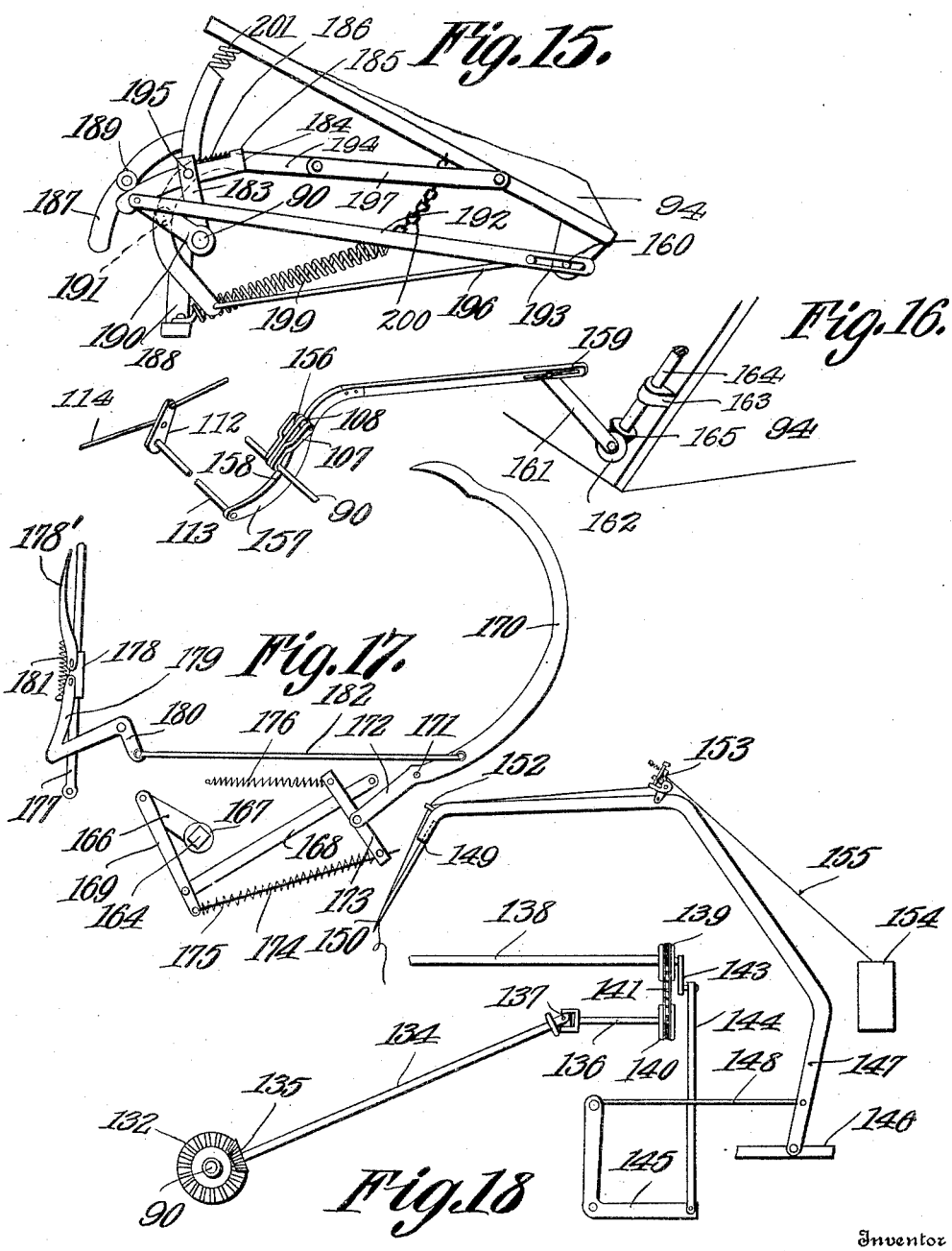

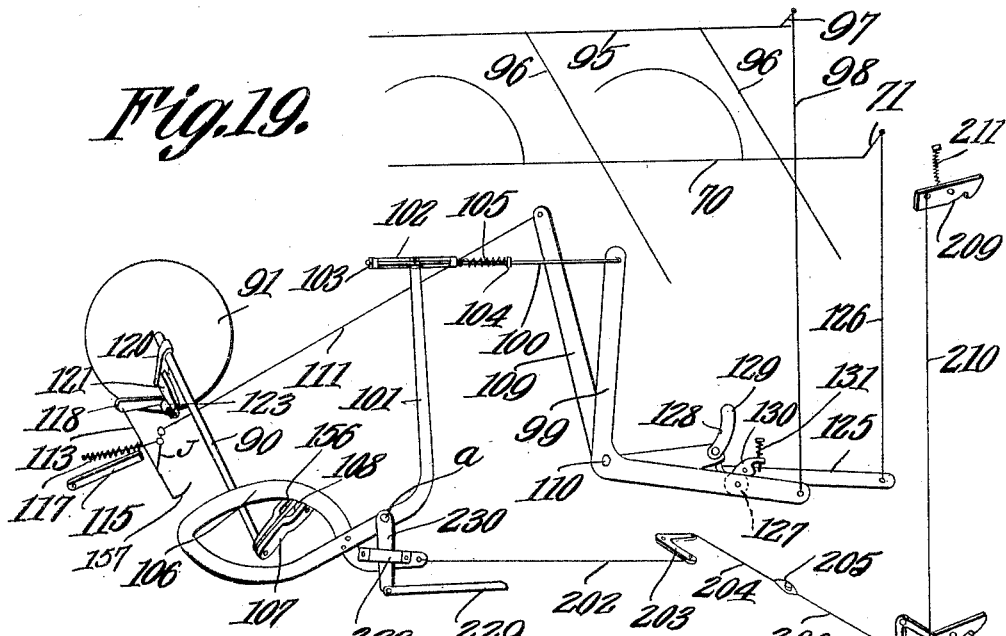

W. R. McHILL.
SHOCKING MACHINE.
APPLICATION FILED APR. 24, 1909.
1,081,247.
Patented Dec. 9, 1913.
8 SHEETS—SHEET 7.
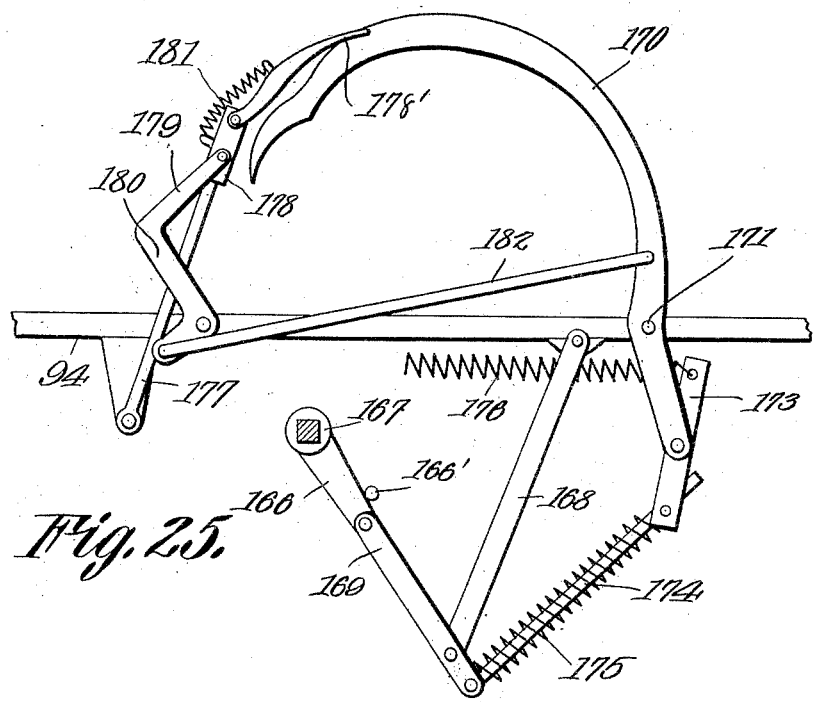
Fig. 25.
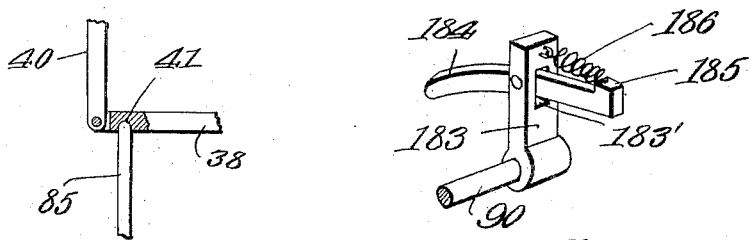
Fig. 23.
Fig. 26.
Witnesses
William R. McHill
Inventor,
by C. A. Snow & Co.
Attorneys.

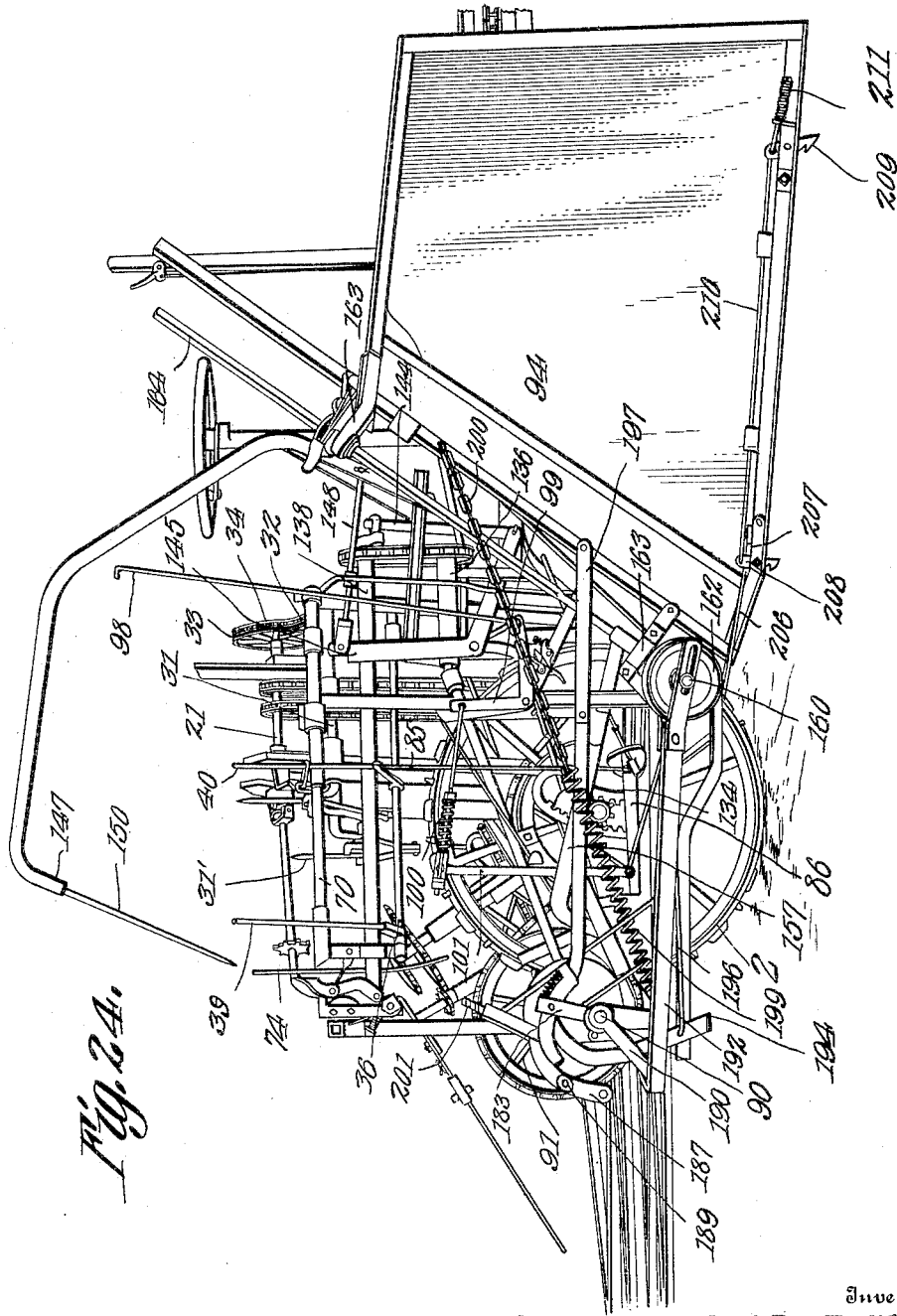

UNITED STATES PATENT OFFICE.

WILLIAM R. McHILL, OF EUREKA, KANSAS.

SHOCKING-MACHINE.

1,081,247. Specification of Letters Patent. Patented Dec. 9, 1913.

Application filed April 24, 1909. Serial No. 491,975.

*To all whom it may concern:*

Be it known that I, WILLIAM R. McHILL, a citizen of the United States, residing at Eureka, in the county of Greenwood and State of Kansas, have invented a new and useful Shocking-Machine, of which the following is a specification.

This invention has relation to corn shocking machines and it consists in the novel construction and arrangement of its parts as hereinafter described and claimed. The machine is especially designed for the purpose of harvesting, shocking and binding ensilage or fodder corn, but the principles involved in the construction herein presented may be advantageously employed for shocking check row or other kinds of corn.

Inasmuch as the invention relates to a shocking mechanism only so much of the harvester will be shown and described as will enable a clear understanding of the subject matter of the invention.

A brief outline of the operation of the invention is as follows: The stalks are cut and passed in horizontal position upon a bunching table. When sufficient stalks are collected upon the table and the bunch arrives at point of maturity, they are released successively and are cast into a bundle receptacle or shock forming receptacle. The individual bundles are permitted to accumulate in the said shock-forming receptacle until sufficient are gathered for the purpose of actuating a trip mechanism at which time enough bundles have accumulated to form a shock, and, upon the actuation of the said trip mechanism, a shock compressing mechanism is operated, which contracts the diameter of the shock, and, at the same time, the binding mechanism is actuated which binds the shock. The machine is also provided with other means whereby the shock receptacle is turned from an inclined position into an upright position, and, at the same time, it is opened, so that the bound shock therein is deposited in upright position upon the ground. Other means are provided for closing the shock receptacle and returning the same to its normal position. By such an arrangement a series of unbound bundles are formed into a shock, and, inasmuch as each bundle is separately formed or compressed it maintains its individuality while in the shock, and but one binding is necessary, namely; that around the shock to maintain the stalks in proper position in the shock. Consequently, when the shock is to be moved, or the bundles composing the same are to be loaded upon a wagon, the stalks composing each individual bundle are not mixed indiscriminately with the other stalks, and each individual bundle may be pitched by hand or with a fork or other implement.

In the accompanying drawings,—Figure 1 is a perspective view of portions of the forward part of the harvester with parts removed. Fig. 2 is a perspective view of the rear portion of the harvester. Fig. 3 is a perspective view of a forward portion of the harvester with parts removed, the said Fig. 3 being approximately viewed at a right angle to the showing made in Fig. 1. Fig. 4 is a diagrammatic plan view of the operating shafts of the harvester. Fig. 5 is a sectional view of a clutch mechanism used upon the harvester. Fig. 6 is a perspective view of one of the said clutch members. Fig. 7 is a perspective view of another of the clutch members. Fig. 8 is a perspective view of still another clutch member. Fig. 9 is a perspective diagrammatic view of a system of arms and levers used upon the harvester. Fig. 10 is a detail plan view of a clutch mechanism used upon the harvester. Fig. 11 is a side elevation of levers forming part of a trip mechanism used upon the harvester. Fig. 12 is a similar view showing the same parts in different positions. Fig. 13 is a side elevation of a retaining device used upon the harvester. Fig. 14 is a perspective view of another form of clutch mechanism used upon the harvester. Fig. 15 is a side elevation of a receptacle operating mechanism used upon the harvester. Fig. 16 is a perspective view of mechanism used upon the harvester for operating stalk-compressing members. Fig. 17 is a front elevation of the stalk-compressing device. Fig. 18 is a side elevation of a needle actuating mechanism used upon the harvester. Fig. 19 is a diagrammatic perspective view showing the levers of the harvester operatively connected with the tripping mechanism and with releasing devices for doors used upon the shock receptacle. Fig. 20 is a plan view showing a portion of the means for operating the receptacle doors. Fig. 21 is a rear elevation of the receptacle. Fig. 22 is a side elevation of the forward portion of the mechanism for operating the receptacle doors. Fig. 23 is a detail view of certain parts of the machine located adjacent the delivery edge of the bunching table. Fig. 24 is a perspective view of the complete machine, the same showing one side of the machine practically in elevation. Fig. 25 is a view similar to Fig. 17 but showing the compressing arms shifted toward each other and locked. Fig. 26 is a perspective view of certain parts shown in Fig. 15.

The shocking mechanism is used in combination with a harvester, the frame of which is indicated as at A in the drawings. The frame A is supported in part upon a traction wheel 2, from which the operating parts of the shocking mechanism derive their movement as will be hereinafter explained.

A sprocket wheel 3 is mounted to rotate with the traction wheel 2 and a shaft 4 is journaled for rotation at the rear portion of the frame A. The sprocket wheel 5 is mounted upon the shaft 4 and the sprocket chain 6 passes around the sprocket wheels 3 and 5. The said sprocket wheel 5 is loosely mounted upon the shaft 4 and any suitable clutch mechanism may be provided for rendering the said sprocket wheel 5 fixed with relation to the said shaft. A clutch device, as illustrated in the drawing, consists of a pin 7 which passes transversely through the shaft 4 and projects at its end portions beyond the sides of the said shaft. One side of the hub of the sprocket wheel 5 is provided with recesses 8 which are adapted to receive the projecting end portions of the pin 7. The opposite end portion of the hub of the sprocket wheel 5 is provided with an annular recess 9 in which the down turned end of a longitudinally movable pin 10 is located. Said rod 10 is slidably mounted in a perforation provided in the bearing 11 which forms one of the supports for the shaft 4. A coiled spring 12 is interposed between one face of the bearing 11 and the down-turned end of the pin 10 and is under tension with a tendency to hold the said pin and the sprocket wheel 5 toward the pin 7. A lever 13 is fulcrumed to the frame A and has its inner or forward end pivotally connected with that end of the pin 10 opposite the end thereof which engages the hub of the sprocket wheel 5 and a hook 14 is pivotally connected with the rear end of the lever 13 and is adapted to engage a perforation provided in the rear rail of the frame A. Thus when it is desired that the said sprocket wheel 5 shall be rendered fixed with relation to the shaft 4, the hook 14 is disengaged from the rear rail of the frame A when the tension of the spring 12 comes into play and forces the said sprocket wheel toward the pin 7. At other times, when the hook is in engagement with the perforation provided in the rear rail of the frame A, the sprocket wheel 5 will be held away from the pin 7 and the said wheel 5 is free to rotate, together with the wheel 3 through the instrumentality of the surrounding chain 6 without operating the shaft 4.

A shaft 15 is journaled for rotation on the forward portion of the frame A and is in parallel relation with shaft 4 heretofore described. A beveled pinion 16 is mounted upon the shaft 15 and meshes with a beveled pinion 17 mounted upon the shaft 18. The said shaft 18 is journaled for rotation upon the frame A and is provided at its opposite end with a beveled pinion 19 which meshes with a beveled pinion 19' mounted upon the shaft 4. Sprockets 22' are secured to shaft 18. (See Fig. 4.)

An inclined stalk-elevating trunk 20 is mounted upon the main frame A. A shaft 21 is journaled for rotation at the upper end of the trunk 20, and sprocket wheels 22 are mounted upon the shaft 21 and chain belts 23 pass around the sprocket wheels 22 and 22'. The said belts 23 are provided with the outstanding fingers 24, which are adapted to pass under the butt end portions of the stalks as the stalks are delivered to the trunk 20, and elevate the said butt ends of the stalks. A sprocket wheel 25 is fixed to the intermediate portion of the shaft 21, and a sprocket wheel 26 is journaled for rotation at a lower portion of the elevator trunk 20. A sprocket chain 27 passes orbitally around the sprocket wheels 25 and 26 and is provided with the outstanding fingers 28 which are adapted to engage the intermediate portions of the stalks as they are elevated. A sprocket wheel 29 is fixed to the forward portion of the shaft 21, and a chain (not shown) passes orbitally around the sprocket wheel 29, and is provided with the outstanding fingers, which are adapted to engage the upper or tassel ends of the stalks as they are elevated along the trunk 20 as above indicated.

From the above description it is obvious that the shaft 21 derives its rotary movement through the instrumentality of the sprocket chains 23, sprockets 22 and 22', gears 19 and 19', and shaft 4 (see Figs. 2 and 4). The sprocket chain 27 is moved in an orbit as above described. As the stalks are lifted along the elevator trunk 20 they pass under a rod 30 and are held in contact with the fingers of the several elevator chains passing orbitally about the trunk 20, and in view of the fact that the upper end of the trunk 20 projects some distance above the upper ends of the runs of the said chains, the fingers may disengage from the stalks when they are lifted to the upper end of the trunk 20 as the stalks are passed up over the elevated end, and the fingers make a turn and descend with the down-going runs of the said elevator chains.

A packer shaft 31 is journaled for rotation below the shaft 21, and slightly to one side of the same. A sprocket wheel 33 is mounted upon the rear end of the shaft 21, and a sprocket wheel 32 is mounted upon the rear end of the packer shaft 31. An endless chain belt 34 passes orbitally around the wheels 32 and 33, and is adapted to transmit rotary movement from the shaft 21 to the shaft 31. The shaft 31 is adapted to operate packer arms one of which is shown at 31′ (Fig. 1) and which are of usual pattern and constitute no part of the present invention. A bunching table 35 is located at the upper end of the trunk 20.

The description following immediately hereafter is directed to mechanism for retaining the stalks upon the table 35 during the time that a bundle is being formed by the packers and to mechanism for releasing the above mentioned mechanism when the bundle has been completed, and to mechanism for pitching the completed bundle from the said table.

A shaft 36 is journaled for rotation below the delivery edge of the table 35, and is provided with laterally disposed arms 37 and 38. A standard 39 is pivotally connected at its lower end with the arm 37, and a standard 40 is pivotally connected at its lower end with the arm 38. Immediately behind the pivotal connection between the standard 40 and the arm 38, the said arm 38 is provided with a recess 41. This recess is adapted to receive the upper end of a rod hereinafter to be explained, and which is designed to hold the said standard and the shaft with which it is connected, through the arm 38 from movement.

A shaft 42 is journaled under the table 35 and is provided with a laterally disposed end 43, to which is pivotally connected a rod 44. Said rod 44 is formed at its opposite end portion into a loop 45, which receives the intermediate portion of the standard 40. A laterally disposed arm 46 is formed at the opposite end of the shaft 42. An angle lever 47 is fulcrumed at the back of the elevator trunk 20, and a rod 48 is pivotally connected at one end with the extremity 46 of the shaft 42, and is pivotally connected at its opposite end with the upper end of the angle lever 47. An angle lever 49 is also fulcrumed at the back of the elevator trunk 20, and a connecting rod 50 is pivotally attached at its upper end with the lower end of the angle lever 47, and is pivotally connected at its lower end with the upper end of the angle lever 49.

The angle lever 49 is fulcrumed in a casting 51, which is mounted at the rear portion of the frame of the shocker. Said casting is provided with a longitudinal bore, in which is journaled a shaft 52. A sprocket wheel 53 is loosely journaled upon the shaft 52 and is provided at one side with a laterally disposed flange 54, the inner side of which is notched as at 55. A sprocket wheel 56 is fixed to the shaft 4, and a sprocket chain 57 passes around the sprocket wheels 53 and 56. Inasmuch as the shaft 4 rotates continuously, while the clutch wheel 5 is in engagement with the pin carried by the said shaft, the wheel 53 will also rotate correspondingly. A disk 58 is fixed to the shaft 52, and is located within the flange 54 carried by the wheel 53. Said disk 58 is provided with a recess 59, and an arm 60 is pivoted to the said disk and normally lies within the recess 59. A coil spring 61 is interposed between the inner edge of the arm 60, and the inner wall of the recess 59, and is under tension with a tendency to project the free end of the said arm 60 beyond the periphery of the disk 58. A roller 62 is journaled to the free end of the arm 60, and has a peripheral portion which projects beyond the free end of the said arm. The free end of the arm 60 is provided with a laterally and outwardly projecting lug 63, and that end of the rocker lever 49 opposite the end with which the rod 50 connects, is provided with a notch 64, which, at times, is adapted to receive the lug 63. The notch 64 includes an inclined surface 65, and a shoulder 66. When the lug 63 is in engagement with the shoulder 66 of the notch 64, the arm 60 is held within the recess 59 of the disk 58 against the tension of the spring 61. But, as soon as the rocker lever 49 is turned upon its fulcrum, so that the notched end thereof is moved beyond the lug 63, the tension of the coil spring 61 comes into play and forces the free end of the arm 60 beyond the periphery of the disk 58.

When the free end of the arm 60 moves beyond the periphery of the disk 58 as above described the roller 62 comes in contact with one of the notches 55 upon the inner face of the flange 54 of the wheel 53, and thus the said disk 58 is caused to rotate with the wheel 53 and through the said disk the shaft 52 is rotated. A beveled pinion 67 is fixed to that end of the shaft 52 opposite the end thereof upon which the sprocket wheel 53 is mounted. A wheel 68 is journaled to the casting 51 and is provided upon one side with a set of beveled gear teeth, which mesh with the beveled pinion 67.

A shaft 70 is journaled for rotation below the delivery end of the table 35 and is provided with a crank end 71. A bar 72 is pivotally connected at its upper end with the extremity of the crank 71 and at its lower end is pivotally connected eccentrically to the wheel 68. Bundle-pitching arms 73 are fixed to the shaft 70 and normally lie below the upper surface of the table 35. Fenders 74 are attached to the end portions of the arms 73 opposite the ends thereof which are connected with the shaft 70 and are adapted to prevent stalks from passing upon the bunching table 35 when the said bundle pitching arms 73 are swung in upright position during the act of pitching a bundle from the said table. One end of a rod 75 is pivotally connected with the crank extremity 71 of the shaft 70 and the opposite end of the said rod 75 has slidable engagement with the upper end of the angle lever 47 and a spring 76 is interposed between a stop 77 mounted upon the said rod 75, and the said upper end of the said lever 47. An arm 78 is pivoted to the rear side of the elevator trunk 20, which pivotal point is preferably coincident with the fulcrum point of the lever 47. A wheel 79 is journaled at the end of the arm 78 opposite the end thereof which is pivotally attached as stated, and the end of the shaft 36 is provided with a crank extension 80, under which the wheel 79 of the arm 78 normally lies. The pivoted end portion of the arm 78 is provided with a depending V-shaped extension 81, which is connected by a bar 82 pivotally with a pivoted arm 83. A rod 84 is pivotally connected with that end of the arm 83 opposite the pivoted end, and the other end of the said rod 84 is pivoted to the bar 72.

When the stalks are being assembled upon the table 35 the stalk-retaining standards 39 and 40 are projected above the upper surface of the said table, and the movement of the packers engages the stalks and forces them toward the said standards. When the stalks have accumulated in such manner as to form a bundle, the pressure of the bundle laterally against the standard 40 swings the said standard upon its pivotal connection with the arm 38 carried by the shaft 36, and the intermediate portion of the said standard 40 comes in contact with the end of the loop 45 carried by the rod 44, and inasmuch as the said rod 44 is pivotally connected with the angle extremity 43 of the shaft 42, the said shaft is partially rotated, and through the angle extremity 46 of the said shaft 42 the rod 48 is moved longitudinally, which in turn swings the angle lever 47 upon its fulcrum. As the said angle lever 47 turns, the rod 50 is moved longitudinally, and the angle lever 49 is swung, which releases the arm 60 carried by the disk 58, and, as above described, the said disk is then caused to rotate with the sprocket wheel 53. Thus the shaft 52 is set in rotation, and, through the instrumentality of the beveled pinion 67, the wheel 68 is rotated. As the said wheel 68 rotates the bar 72 is moved longitudinally, and, inasmuch as the upper end of the said bar is pivotally connected with the crank extremity 71 of the shaft 70, the said shaft is partially rotated and the bundle pitching arms 73 are swung in an upward direction, so that the bundle located thereon is pitched from the delivery edge of the table 35. As the free ends of the said arms 73 move upward they are followed by the fenders or rods 74, and, as the said rods will then traverse the path of movement of the stalks as they are about to be delivered to the table 35, such stalks as are about to be deposited upon the said table are held back and cannot assume position upon the table 35 and prevent the return of the arms 73 to their normal positions. The parts are so arranged that as the wheel 68 describes a complete revolution the shaft 70 oscillates through one half of a revolution.

At the same time that the wheel 68 describes the revolution above mentioned the rod 84 is moved longitudinally, and, as a result of such movement, the arm 83 is swung upon its pivot and, through the connecting members 82 and 81, the arm 78 is swung upon its pivot, and the wheel or roller 79 carried at the end thereof, passes up against the upper portion of the crank extremity of the shaft 36, thus the said shaft 36 is partially rotated and the arms 37 and 38 carried thereby are caused to descend, which draws down the standards 39 and 40 and removes obstructions to the lateral pitching of the bundle by the arms 73. It will be of course understood that the parts are so arranged that the standards 39 and 40 descend just prior to the lateral swinging movement imparted to the arms 73.

As the wheel 68 continues its movement the bar 72 is moved longitudinally in an upward direction, which movement has the effect of partially rotating the shaft 70 in a direction opposite to that just above described, and the arms 73 are brought back to their normal position at the surface of the table 35. At the same time the rod 75 is moved longitudinally, and, through the resilient connection 76 between the said rod 75 and the upper end of the angle lever 47, the said lever is moved or swung upon its fulcrum in a direction opposite to that in which it is swung when actuated as a result of the movement of the rod 48. Thus, through the connecting rod 50, the angle lever 49 is moved back to its normal position, and the notched end of the said lever 49 is brought into the path of movement of the extension 63 of the arm 60, and when the said arm comes in contact with the said notch the arm is depressed and the clutch connection between the disk 58 and the ratchet wheel 53 is broken.

A vertically disposed rod 85 is pivotally connected at its lower end with the working end of a lever 86, which is fulcrumed to the frame of the shocker and which is provided at its opposite end with a friction roller 87, adapted to be actuated by an eccentric cam, hereinafter to be described. A tilting bundle-receptacle is included in the shocker, and when the said receptacle swings to dumping position the parts are so arranged that the lever 86 is swung upon its fulcrum, and the rod 85 is projected up through the recess 41 preventing lateral movement of the standard 40, thus locking the standard in bundle-retaining position, or the said rod 85 may be projected up into the loop 45 carried at the end of the rod 44 as indicated in the diagrammatic view, Fig. 9.

The description following immediately hereafter is directed to mechanism for assembling the bundles to form a shock, for mechanism for compressing the same, and for mechanism for binding the shock prior to the operation of depositing the same in position upon the ground. The description will also refer to the detailed structure of the shock receptacle and the manner in which it is operated, including means for turning and returning the same, as well as means for opening and closing the same. The subsequent description will also explain the structure, location and operation of mechanism for returning all of the parts of the harvester, not heretofore described, to their normal positions.

A shaft 90 is journaled in suitable bearings provided upon the frame of the shocker and extends transversely across the front portion of the traction wheels 2. A sprocket wheel 91 is journaled on the inner end of the said shaft 90, and a sprocket wheel 92 is fixed to the inner end of the shaft 15. A sprocket chain 93 passes around the wheels 91 and 92.

A bundle receptacle 94 is tiltably mounted below the delivery edge of the bundle-forming table 35, and a shaft 95 is journaled upon an upright of the frame and is located substantially above the delivery end of the bundle-forming table 35. Arms 96 are fixed to the shaft 95 and normally lie in inclined position above or within the receptacle 94. A relatively short arm 97 is also fixed to the shaft 95 and is disposed over the upper portion of the receptacle 94. A rod 98 is pivotally connected at its upper end with the arm 97, and the lower end of the said rod 98 is pivotally connected with a rocker lever 99 which is fulcrumed to the frame.

As illustrated in the drawings, the rocker lever 99 is of angular configuration, and to its upper end is pivotally attached the rear end of a rod 100. A lever 101 is also fulcrumed to the frame, or an upright carried thereby, at the point $a$ as indicated in Figs. 19 and 22 and is provided at its upper end with a pivoted guide 102. The forward end of the rod 100 passes through the end portions of the said guide 102, which end portions are laterally disposed and slidably receive the said rod. A nut 103 is screw-threaded upon the front end of the rod 100 and bears against the forward end of the guide 102. A stop 104 is adjustably mounted upon the rod 100, and a coil spring 105 surrounds the rod 100 and is interposed between the front face of the stop 104 and the rear end of the guide 102. The lower forward end of the lever 101 is formed into a loop 106 which surrounds the shaft 90 and is adapted to be engaged by a roller 108 carried by an arm 107 also mounted upon the shaft 90. An angle lever 109 is also fulcrumed to the frame A, the fulcrum point of said lever being coincident with the fulcrum point of the rocker lever 99 above referred to. The fulcrum point of the said levers is designated at 110.

A rod 111 is pivotally connected with the upper end of the lever 109, and the forward end of the said rod 111 is pivotally attached to a laterally disposed arm 112, carried by a shaft 113, which is journaled for rotation at the forward portion of the frame A. A rod 114 is pivotally connected at its rear end with the arm 112, and passes through a guide 115 carried by the frame. A nut 116 is screw-threaded upon the forward end of the rod 114, and a coil spring 117 is interposed between the said nut 116 and that end of the guide 115 through which the rod 114 passes. The shaft 113 is provided at that end opposite the end which carries the arm 112, with a laterally disposed arm 118 of peculiar configuration, and which hereinafter will be referred to as a "gear hook." The said arm 118 is provided with a curved extremity 119, and the arm 118 normally lies in an approximately horizontal position, while the arm 112 normally assumes a vertical position. An arm 120 is fixed to the shaft 90, and a section 121 is pivotally attached to the outer end of the said arm and is adapted to swing in a plane parallel with the axis of the shaft 90. Laterally disposed pins 122 are concentrically arranged upon the wheel 91 and project toward the arm 120. A laterally disposed roller 123 is carried at the free end of the section 121, and a spring 124 is attached at one end to a fixed point and at its opposite end to the section 121 and is under compression with a tendency to carry the free end of the said section 121 into alinement with arm 120 and with roller 123 in the path of the pins 122 carried by the wheel 91. The curved extremity 119, of the arm 118, normally holds the section 121 in substantially parallel relation with the shaft 90, but when the rod 111 is moved longitudinally (in a manner as will be hereinafter explained) the shaft 113 is partially rotated by the lateral swinging of the arm 112, and the gear hook 118 is caused to descend below the lower end of the section 121. When this occurs the pressure of the spring 124 comes into play and the said section 121 is swung into a position at right angles to shaft 90 and the roller 123 carried thereby engages one of the pins 122 of the wheel 91. Inasmuch as the arm 120 is fixed to the shaft 90, and by reason of the engagement of the section 121 with one of the pins 122, as above set forth, the said shaft 90 is caused to rotate in unison with the wheel 91. When however, the said shaft 90 has completed a revolution, the curved extremity 119 of the arm 118 engages the section 121 of the arm 120 and swings the same back into its normal position against the pressure of the spring 124, and thus the clutch connection between the wheel 91 and the shaft 90 is broken, and the said wheel 91 may continue to rotate, while the shaft 90 and its attached parts come to a state of rest. A lever 125 is also pivoted at one end to the fulcrum 116 above mentioned, and the opposite rear end of the said lever 125 is pivotally connected by means of a rod 126 with the arm 71 upon the rear end of the bundle-pitching shaft 70, above described. It is by reason of this connection 126 between the shaft 70 and the lever 125 that the said lever 125 oscillates vertically at each partial revolution of the shaft 70; that is to say, at each time that the said shaft 70 makes a partial turn to cast a bundle from the table 35. A roller, 127, is journaled to the lower portion of the lever 99 at a point intermediate of its ends and is laterally disposed with relation to the said lever. A hook 128 is pivoted to the rear end of the lever 109 and is provided with a curved shank 129 which lies in the path of movement of the periphery of the roller 127. The opposite or hooked end of the said hook 128 lies to one side of the path of movement of the periphery of the roller 127 and is so weighted as to normally hold the shank 129 of the said hook 128 in the path of movement of the said roller 127. A pawl 130 is pivoted to the lever 125 and is provided with a downwardly disposed end, in the path of movement of which the hooked extremity of the hook 128 is adapted to be projected when the periphery of the roller 127 comes in contact with the shank 129 of the said hook 128. A spring 131 is interposed between the upper end of the pawl 130 and the upper end of the lever 125 and is under compression, with a tendency to hold the lower end of the said pawl 130 toward the hook 128. By reason of its resiliency however the said spring 131 will permit the lower extremity of the pawl 130 to escape the hook 128 as the said pawl moves in an upward direction.

The parts above described and designated by numerals from 95 to 131 may be known as a "tripping mechanism" for throwing parts into gear whereby the receptacle 94 may be tilted to dumping position and returned while the binding and tying of the shock takes place. It will therefore appear that as the bundles of stalks are accumulated in the receptacle 94 with their tops to the front and are cast by the arms 73 under the arms 96, that the said arms 96 will gradually move upward about the axis of the shaft 95, and as the said shaft 95 is partially rotated the arm 97 is elevated, which moves longitudinally the rod 98. Coincident with the movement of the rod 98 the lower rear end of the angle or rocker lever 99 is elevated, and when the arm 96 has been moved to such an extent as may be predetermined, which extent is preferably when the receptacle 94 is full of bundles, the periphery of the roller 127 comes in contact with the shank 129 of the hook 128, and the said hook is swung upon its pivotal connection with the lever 109, so that its lower extremity is projected into the path of movement of the lower end of the pawl 130, carried by the lever 125. By reason of the fact that the said lever 125 oscillates or moves vertically at the delivery of each bundle into the receptacle 94 as the lever 125 moves down in response to the longitudinal movement of the rod 126 through the instrumentality of the partial rotation of shaft 70 and turning of the arm 71 carried thereby, the rear end of the angle lever 109 is swung down, and the upper end of the said lever 109 is swung rearwardly. As the upper end of the lever 109 moves as last above indicated the roll 111 is moved longitudinally, and, through the connecting arm 112, the shaft 113 is partially rotated and the hooked extremity 119 of the arm 118 is swung below the free end of the section 121 of the arm 120. Thus the said section 121 is free to swing in response to the compression of the spring 124 as above described. Thus it will be seen that as the last bundle is deposited in the receptacle 94 means is provided for rotating the shaft 90 and through the operative connection between the said shaft 90 and the receptacle 94 (hereinafter to be explained) the said receptacle 94 is moved from receiving to dumping position. At the time that the said receptacle 94 is swinging from the first to the last said position it is necessary that the arms 96 should be swung above the said receptacle sufficiently to permit the receptacle and its contents to clear the said arms when assuming dumping position. Provision is made for this contingency through the instrumentality of the lever 101 and its connections as above described. For as the shaft 90 rotates the roller 108 at the end of the arm 107 engages the under side of the forward edge of the lever 106 and swings the said lever upon its fulcrum whereby its rear end is forced to descend. Thus the lower end of the lever 101 is swung rearwardly and its upper end correspondingly swings in a forward direction. Inasmuch as the forward end of the guide 102 pivotally attached to the upper end of the lever 101 engages the nut 103 upon the rod 100, the said rod 100 is moved longitudinally, which swings the lever 99 so that its rear end is carried to a higher elevation or point than that above described. Thus the rod 98 is converted from a pull rod into a push rod, and, through the upward movement of the said rod 98 and the arm 97, the shaft 95 is further rotated, which swings the arms 96 up above the receptacle 94 and its contents, whereby sufficient room is cleared for the turning of the receptacle as above indicated. As soon as the roller 108 carried by the arm 107 moves in its path beyond the forward end of the lever 106, the forward end of the said lever may descend, and through reverse movement of the lever 101 and the connecting rod 100 and the lever 99, the rod 98 may descend and the shaft 95 may swing so that the arms 96 are brought toward the upper edge of the receptacle 94. It is of course to be understood that this return movement on the part of the arms 96 occurs after the receptacle has dumped its load upon the ground and has assumed its receiving position, the parts being so timed in their arrangement as to accomplish this operation. Also as soon as the rear end of the lever 109 has been depressed in the manner as above described by the engagement of the pawl 130 with the hook 128, and the said pawl moves away from the said hook, the rod 111 is free to move longitudinally in a forward direction, which it does in response to the compression of the spring 117 bearing against the nut 116 carried by the bolt 114, which in turn is pivotally attached to the arm 112 of the shaft 113. Thus the said shaft is partially rotated into its normal position and the arm 118 carried at the inner end thereof is moved into the path of movement of the swinging section 121 of the arm 120 and the gear connection as above described is interrupted.

A beveled gear wheel 132 is fixed to the shaft 90 and is provided upon one side with a cam flange 133 which is engaged by the roller 87 at the forward end of the lever 86 above described, and which is adapted to actuate or move longitudinally the rod 85 to engage the recess 41 of the arm 38 of the standard shaft 36, whereby the said standard is held against lateral movement as above indicated. It is of course to be understood that as the shaft 90 revolves the contact between the cam rim 33 and the roller 87 at the forward end of the lever 86 is such as to cause the forward end of the said lever 86 to swing down, which correspondingly swings the rear end of the said lever up and moves the rod 85 as indicated. The parts are so timed that the rod 85 is moved up as indicated while the receptacle 94 is brought to dumping position, but when the said receptacle 94 swings back into receiving position the cam rim 133 has moved about the axis of the shaft 90 to such an extent as to move the forward end of the lever 86 up, which causes the rod 85 to descend and the standard 40 is thereby rendered free for lateral movement as above described. A shaft 134 is journaled for rotation upon the superstructure of the frame A and is provided at its forward end with a fixed beveled pinion 135 which meshes with the beveled gear wheel 132 upon the shaft 90. A stub shaft 136 is journaled for rotation at the rear portion of the superstructure of the frame and is connected with the rear end of the shaft 134 by means of a universal joint 137. Said joint may be of usual construction and further description thereof is unnecessary. A knotter shaft 138 is journaled for rotation upon the superstructure of the frame and is provided at its rear end portion with a sprocket wheel 139. A sprocket wheel 140 is mounted upon the rear end of the stub shaft 136 and a chain belt 141 passes around the said sprocket wheels 139 and 140. The shaft 138 throughout this specification will be referred to as the "knotter shaft" for the reason that knot-tying mechanism 142 is located at its forward end and is operated thereby. The said mechanism 142 is of usual construction and arrangement and forms no part of the present invention, and therefore detailed description thereof in this specification will not be given, and the said part 142, when occasion arises, will be referred to as the "knotter".

It will be observed that as the shaft 91 describes its rotation as above set forth, the wheel 132 will be carried around by the same and that through the intermeshing wheel 135 the shaft 134 will be rotated, which will correspondingly rotate the shaft 136 and through the sprocket and chain connections 139 to 141 inclusive, the shaft 138 is rotated, whereby the knotter 142 is operated. A crank 143 is fixed to the rear end of the shaft 138 and is connected by means of a pitman 144 with the lower rear end of the angle lever 145. The said lever 145 is fulcrumed to the superstructure of the frame A. A bracket 146 extends rearwardly from the superstructure of the said frame, and a needle arm 147 is pivotally attached at its lower rear end to the said bracket 146. A rod 148 is pivotally connected at its forward end with the upper end of the angle lever 145 and is pivotally attached at its rear end to the needle arm 147 at a point above its pivotal connection with the bracket 146.

The needle arm 147 extends upwardly and forwardly with relation to the frame of the machine, and its forward end is disposed above the knotter 142. The upper forward end of the arm 147 is provided with a socket 149 which is adapted to receive the upper end of the needle 150. The needle 150 is provided with an eye 151 which is located in the vicinity of its lower pointed end. The arm 147 is provided at its upper forward end with a twine guide 152, and upon its upper side is also provided with a twine tensioning device 153. Said device may be of usual pattern, and further description thereof is unnecessary. A twine box 154 is attached to the superstructure of the frame A, and the twine 155 passes from the said box through the tensioning device 153, from thence through the eye or guide 152, and thence through the eye 151 of the needle 150, and thence through the twine-holder element of the knotter 142.

The arm 147 is normally held in such position that the pointed end of the needle 150 is spaced from the knotter 142, and the twine extends from the eye 151 of the said needle to the said knotter 142. Consequently, as each bundle is pitched from the table 35 it moves the twine 155 laterally between the needle 150 and the knotter 142, the tension device 153 keeping the said twine comparatively tight about the bundle or bundles as they accumulate.

When a sufficient number of bundles have accumulated in the receptacle 94 and the shaft 90 is started in rotation as above described, the knotter 142 is actuated, and, at the same time, the crank 143 is rotated about the axis of the shaft 138, and through the pitman 144 the lever 145 is rocked upon its fulcrum, whereby the rod 148 moves longitudinally. The said rod moves in a forward direction and swings the arm 147 upon its pivotal connection with the bracket 146. This causes the needle 150 to descend and engage the parts of the knotter 142, whereat the knot is tied and the twine is severed and secured in the usual manner. As the shaft 90 continues in its rotary movement the rod 148 is moved rearwardly through the intervening connections, and the arm 147 is swung in an upward direction, whereby the needle 150 is carried away from the knotter 142. Inasmuch as the shaft 90 rotates at the time that the receptacle 94 is moving from a receiving to a dumping position, it is apparent that the knot-tying operation and the binding of the shock as above described occurs just prior to the time that the receptacle 94 is moved from its receiving position to dumping position.

The arm 107 which is fixed to the shaft 90 above described is provided with a second pulley wheel or roller 156. A lever 157 is pivoted at its forward end to the extremity of the shaft 113 and is provided with a forward arcuate portion 158, which is disposed below the roller 156 and which normally lies in the path of movement of the said roller as it revolves around the axis of the shaft 90. The rear end of the lever 157 is provided with an elongated slot 159. A shaft 160 is located under and is fixedly connected to the receptacle 94 and constitutes the pivot thereof and this shaft is provided with a crank extremity 161 which enters the slot 159 of the lever 157. A beveled pinion 162 is fixed to that end of the shaft 160 opposite the end thereof upon which the crank 161 is mounted. The receptacle 94 is provided with bearings 163 in which a shaft 164 is journaled for rotation. A beveled pinion 165 is fixed to the lower or rear end of the said shaft 164 and meshes with the beveled gear wheel 162 upon the shaft 160. The upper portion of the shaft 164 is squared or non-circular, and an arm 166 is provided with an eye 167 which snugly receives the upper non-circular portion of the said shaft 164. A link 168 is pivotally connected at one end with the upper or forward edge of the bottom of the receptacle 94, and a link 169 is pivotally connected at one end with the outer extremity of the arm 166 and at its opposite end portion is pivotally connected with the lower end of the link 168. A substantially semi-circular arm 170 is pivoted at the point 171 to the upper or forward edge of the bottom of the receptacle 94, and provided with a shank portion 172 which projects below the said edge of the said receptacle. A cross arm 173 is pivotally attached at an intermediate point to the lower extremity of the shank 172.

A rod 174 is pivotally connected at one end with the end of the link 169 and slidably engages at its opposite end portion one of the extremities of the cross arm 173. A coil spring 175 surrounds the rod 174 and bears at one end against the extremity of the link 169, and at its opposite end against the end of the arm 173. A spring 176 is attached at one end to the upper or forward edge of the bottom of the receptacle 94 and is connected at its opposite end with the end of the cross arm 173 opposite the end thereof with which the rod 174 has slidable engagement.

A standard 177 is pivotally attached at its lower end to the upper or forward edge of the bottom of the receptacle 94 at the side thereof opposite the side with which the circular arm 170 is connected. A sleeve 178 is slidably mounted upon the standard 177, and is pivotally engaged by an arm 179 extending from a bell crank lever 180, which lever in turn is pivotally connected at the upper or forward edge of the bottom of the receptacle 94. A gripping arm 178' is pivotally connected to the sleeve 178 and a spring 181 is interposed between the adjacent end portions of the arm 178' and the arm 179 and is under compression with a tendency to press the free end of the arm 178' against standard 177 and toward the free end of the arm 170. A rod or bar 182 is pivotally connected at one end with the arm 170 at a point above the pivotal point 171 of the said arm, and the said rod or bar 182 is pivotally connected at its opposite end with that end of the bell crank lever 180 opposite the end thereof to which the arm 179 is attached.

From the above description it will be seen that as the shaft 90 rotates and the arm 107 is carried around therewith, the roller 156 will come in contact with the upper edge of the arcuate portion 158 of the lever 157, and, inasmuch as the said lever is pivotally connected at its forward end with the shaft 113, the rear end of the said lever will be depressed and moved rearwardly. Thus the forward edge of the slot 159 will be brought in contact with the extremity of the crank 161 and the said crank will be turned about the axis of the shaft 160. As the said shaft 160 rotates the wheel 162 is carried around with the same, and, through the intermeshing pinion 165, the shaft 164 is caused to describe approximately one half of a revolution.

The parts are so arranged and the movements are so timed that rotation of the shaft 164 last above described occurs just prior to the movement of the receptacle 94 from a receiving to a dumping position. The partial revolution of the shaft 164 carries the arm 166 around its axis and the link 169 is moved longitudinally, which in turn will swing the link 168 laterally upon its pivotal connection with the upper or forward edge of the receptacle 94. The rod 174 moves with the link 169, the rod however having more of a lateral than a longitudinal movement, although it has both movements. As the said rod moves longitudinally the spring 175 is compressed and pushes against arm 173 thus causing the circular arm 170 to turn upon its pivot 171, and the upper or free end of the said arm is brought toward the middle or center of the receptacle 94. The movement last above described continues until the pivotal connection between the outer extremity of the arm 166 and the link 169 passes beyond the pivotal connection between the said link 169 and the link 168, and approaches the pivot point 171 of the arm 170 when by the influence of the springs 176 and 175 the parts become locked in this position with the arm 166 bearing against a stop 166', the action of the springs being such as to hold the arm 166 pressed against the stop (see Fig. 25).

The lateral movement of the arm 170 as above described moves the rod or bar 182 longitudinally, which in turn swings the rocker 180 upon its pivotal connection with the edge of the receptacle 94, and the opposite end of the said rocker 180 is elevated, which carries with it the arm 179 and causes the sleeve 178 to slide along the standard 177. As this occurs the said standard 177 is swung inwardly upon its pivotal connection with the receptacle 94, and the upper or free end of the arm 178' crosses or passes beyond the upper end of the arm 170. Thus the bundles of corn contained within the receptacle 94 are encircled and compressed by the movement of the arms 170 and 178 as described, such compression occurring substantially midway between the ends of the stalks, at which line the shock is bound by the twine, as above described.

As above stated, the compression of the shock takes place just prior to the rearward movement of the receptacle 94 from receiving to dumping position, about the shaft 160 as an axis. This movement is effected positively as hereinafter set forth. The rearward movement of the rear end of the lever 157 is approximately just sufficient to move the crank 161 of the shaft 160 slightly to the rear, and, when the said crank reaches this position the center of gravity of the receptacle 94 (which is being operated by its separate mechanism as hereinafter described) is slightly rearwardly disposed with relation to the support upon which the said receptacle 94 is mounted. Consequently, the said receptacle 94 will continue its rearward swing by the action of gravity, and the shaft 160 will rotate therewith until the crank 161 is carried away from the forward end of the slot 159, and is brought in contact with the rear end of the said slot. The shaft 160 is thus held against further rotation and as the receptacle 94 continues its downward and rearward movement, gear 165 will travel on gear 162 and cause the shaft 160 to rotate in the opposite direction from that in which it has been previously turning, and the lock established between the arm 166 and the links 168 and 169 as above described is broken, the springs 176 and 175 returning the parts of the stalk compressing mechanism to their normal positions. Thus, it will be seen that the unlocking of the parts occurs practically at the time that the receptacle 94 assumes dumping position, and, consequently, the shock carried by the said receptacle is positioned upon the ground at the same time that the arms 170 and 178 move away from each other, and when the receptacle 94 swings back into its normal position (as will be hereinafter explained) the parts numbered from 157 to 182 will assume their normal positions, as above described.

An arm 183 is fixed to the outer end portion of the shaft 90 above described, and is slotted at its outer end, in which slot 183' is pivotally located a pawl 184. The said pawl is pivotally mounted at a point intermediate of its ends and is provided at one end with a shoulder 185. A spring 186 is interposed between the outer end of the arm 183 and the shoulder 185 at the end of the pawl 184. The said spring is under compression with a tendency to hold the shouldered end of the said pawl toward the axis of the shaft 90. It will therefore appear that the opposite end portion of the said pawl 184 is normally disposed away from the axis of the said shaft 90. An arm 187 extends forwardly from an upright 188 mounted at the forward portion of the frame A and is provided upon its side with a journaled roller 189. The said roller 189 is located in the path of movement of the outwardly disposed end portion of the pawl 184. An arm 190 is loosely journaled upon the outer extremity of the shaft 90 and is provided upon its inner side and at a point intermediate of its ends with a journaled roller 191. The said roller 191 is located in the path of movement of the shouldered end of the pawl 184 when the said end of the said pawl is disposed toward the axis of the shaft 90. A bar 192 is pivotally connected at its forward end with the outer extremity of the arm 190 and is provided at its rear end with an elongated slot 193 which receives the extremity of the shaft 160 above described. A hook-shaped lever 194 is fulcrumed at the point 195 to the upright 188, and its forward end is pivotally connected by means of a rod 196 with the rear portion of the bar 192, which connection between the said rod and bar occurs in the vicinity of the forward end of the slot 193 in the said bar. A bar 197 is pivotally connected at its forward end with the rear end of the lever 194, and the rear end of the said bar 197 is pivotally connected with a beam 198 attached to the forward side of the receptacle 94. A coil spring 199 is attached at its forward end to the forward portion of the frame A, and the rear end of the said spring is connected by means of a chain or other flexible member 200 with the upper portion of the said beam 198. The upper end of the upright 188 is rearwardly disposed or curved and a buffer spring 201 is located thereon.

The mechanism last above described is the means designed to swing the receptacle 94 upon its pivotal connection with the frame A from receiving to dumping position and to return the same to receiving position, and the operation of the said mechanism is as follows:—As the shaft 90 describes a revolution as heretofore set forth the arm 183 is carried around with the same, and when the arm 183 has described approximately two hundred and forty degrees of an arc the shouldered end of the pawl 184 comes in contact with the side of the roller 191 upon the loose arm 190. As the arm 183 continues in its movement with the shaft 90 the arm 190 moves with the same and the bar 192 is moved longitudinally in a rearward direction. As the said bar 192 moves as last above described the rod 196 is moved rearwardly and the lever 194 is swung upon its fulcrum 195, so that its forward end moves rearwardly and its rear end elevates. Thus the bar 197 is moved longitudinally and the receptacle 94 is swung rearwardly upon its pivotal connection with the frame A. At the time that the said receptacle 94 assumes dumping position as last above described the outwardly disposed end portion of the pawl 184 engages the periphery of the roller 189 upon the arm 187, and the said pawl 184 is swung upon its pivotal connection with the arm 183 against the pressure of the spring 186, and the shouldered end of the said pawl 184 is moved away from the axis of the shaft 90. Thus the shouldered end of the said pawl 184 is moved beyond the periphery of the roller 191 carried by the arm 190, and approximately at this time the shaft 90 has completed its revolution, and, consequently, the pawl 184 comes to a state of rest.

As the receptacle 94 turns rearwardly as above described the flexible connection 200 is moved longitudinally and the spring 199 is stretched and its tension is increased; therefore, as soon as the shouldered end of the pawl 184 passes beyond the roller 191, the increased tension of the spring 199 comes into play and through the connection 200 the receptacle 94 is swung back into bundle-receiving position. As the receptacle 94 swings back to bundle-receiving position the movement of the lever 194 is reversed from that above described through the connecting bar 197, and through the connecting rod 196 the bar 192 is moved forwardly, and the arm 190 is swung to normal position. When the receptacle 94 is swung to bundle-receiving position under tension of the spring 199, its forward side comes in contact with the buffer spring 201 which cushions and checks the movement of the said receptacle 94 and breaks the force of contact between the receptacle and its support when in bundle-receiving position.

It will be observed that when the receptacle 94 swings from bundle-receiving position to shock-dumping position that it describes an arc upon its pivotal connection (shaft 160) with the frame A, and that its initial movement is upwardly inclined. This upward movement on the part of the said receptacle 94 has the effect of stripping or pulling the twine around the shock from the knotting mechanism and completing the tying of the knot in a manner similar to the method usually employed in binders for completing the knot-tying operation. The difference in applicant's manner of effecting the completion of the knot over the methods commonly used is that in the present instance the shock is lifted to remove the knot from the knotter while in general practice the shock or bundle is permitted to fall, and, by its weight, strip or remove the knot from the knotting mechanism.

Inasmuch as the shaft 90 must describe approximately two thirds of a rotation before the pawl 184 is brought in contact with the roller 191 at the side of the arm 190, it will be seen that the receptacle 94 is not moved from bundle-receiving position to shock-dumping position until the said shaft 90 has almost completed its rotation. Therefore plenty of time has elapsed during the initial rotation or movement of the shaft 90 to accomplish the shock-compressing operation, binding and tying, as above described.

The mechanism described immediately hereafter pertains to latching mechanism for holding movable doors connected with the receptacle 94 in closed position, when the said receptacle is in bundle-receiving position, and also to mechanism for releasing the said latching mechanism when the said bundle receptacle 94 swings to shock-dumping position as above described.

A rod 202 is pivotally connected at its forward end with the rear end of the lever 106 heretofore described, and at its rear end the said rod 202 is pivotally connected with the forward end of an angle lever 203 which is fulcrumed at any suitable point to the rear portion of the frame A. A rod 204 is pivotally connected with the rear end of the said angle lever 203, which is connected by means of a swivel joint 205 with a rod 206, which extends transversely along the edge portion of the receptacle 94 and close to and parallel with shaft 160, the swivel joint being located in alinement with the inner side of the receptacle. A rocker lever 207 is pivotally mounted at the outer edge of the said receptacle 94, and the outer end of the said rod 206 is pivotally connected with the inner end of the said lever 207, the connections between rod 206 and levers 203 and 207 being loose to allow a limited amount of lost motion. The opposite end portion of the rocker lever 207 lies behind the upper end of a catch 208 which is pivoted in a perforation provided in the edge of the said receptacle 94. A similar catch 209 is similarly mounted at the opposite side portion of the outer edge of the said receptacle 94, and the catches 208 and 209 are pivotally connected together at their forward or upper ends by a rod 210. A coil spring 211 is connected at one end with the catch 209 and at its opposite end is fixed to the receptacle 94. The said spring 211 is under tension with a tendency to hold, through the connecting rod 210, the end of the catch 208 in close contact with the outer end of the rocker lever 207. The rear or lower ends of the said catches 208 and 209 are adapted to engage bars or keepers provided upon hingled doors attached to the receptacle 94, as will be hereinafter explained.

The operation of the mechanism last above described is as follows:—As the shaft 90 rotates the arm 107 is carried around with the same, and, through the engagement between the roller 108 and the forward end of the lever 106, the said lever is swung so that its rear end moves the rod 202 longitudinally in a rearward direction. This movement on the part of the said rod 202 swings the lever 203, which in turn moves the rods 204 and 206 longitudinally, and they, in turn, swing the lever 207, which swings the latch 208 upon its pivot. As the latch 208 swings as above described the rod 210 is moved longitudinally, and the latch 209 is moved in a manner corresponding to that of the movement of the latch 208, the movement upon the part of the latch 209 being against the tension of the spring 211 above described. Thus the said latches 208 and 209 are moved away from the keepers above referred to and which will be hereinafter located and described, and the doors or door of the receptacle 94 is rendered free to swing to open position. Inasmuch as the movement upon the part of the rod 202 occurs when the shaft 90 rotates the said latches are swung at the time that the receptacle 94 is moved from bundle-receiving position to shock-dumping position, and, by reason of the facts that the parts 202 to 204 inclusive are carried by the frame A of the machine, and the parts from 206 to 211 inclusive are carried by the receptacle 94, the swivel joint 205 permits the said receptacle to swing from one position to the other as above described without affecting the parts 202 to 204 inclusive.

A vertically disposed shaft 212 is journaled at the rear edge of the frame A and is mounted at its lower end in a socket 213, which is supported by the said frame and enters a bearing 214 at its upper portion mounted upon the superstructure of the frame. Laterally disposed arms 215 are fixed at their inner ends to the said shaft 212 and carry a door section 216. Arms 217 are hingedly attached to the outer extremities of the arms 215, and are provided at their outer ends with keepers or lugs 218, which are adapted to be engaged and retained by the latches 208 and 209 above described. A plate 219 is fixed to the inner end of each of the arms 217, and the outer end of a rod 220 is pivotally connected with each of the said plates 219. The inner ends of the rods 220 are slidably mounted in guides 221 carried by the arms 215 and a stop 222 is mounted upon each rod 220. A coil spring 223 surrounds each rod 220 and is interposed between the stops 222 and the guides 221. An adjustable nut 224 is screw-threaded upon the inner end of each of the rods 220 and normally bears at its face against the stop 222. A door section 225 is supported by the arms 217, and the said door sections 216 and 225 form a closure for the rear of the receptacle 94. As has been heretofore described, when the lever 106 is swung the latches 208 and 209 are released from the keepers 218, and thus the door sections 225 and 216 are liberated, and the said sections may swing rearwardly upon the axis of the shaft 212. This movement on the part of the said door sections of course occurs when the receptacle 94 begins to turn from bundle-receiving position to shock-depositing position. It will therefore appear that when the receptacle 94 turns as indicated the shock is moved from an inclined or reclining position to an upright position, and is deposited, butt ends down, upon the ground. It will also be seen that inasmuch as the door sections 225 and 216 are supported by the vertically disposed shaft 212, they swing horizontally when they open, and that the receptacle 94 swings vertically when it assumes dumping position, and that the said door sections and the said receptacle swing rearwardly when assuming the abnormal positions last above indicated. Thus, when the shock is deposited upon the ground, the section 216 will clear the same as the machine moves forward, but, under the pressure of the springs 223 and the connecting rods 220, with the plates 219, the outer edge of the door section 225 will brush against the side of the shock, and when the said section 225 passes beyond the shock the pressure of the springs 223 comes into play and forces the door section 225 into the same plane as that in which the door section 216 lies. Having described the means whereby the said door sections may be liberated and opened as the receptacle 94 tilts backward, it necessarily follows that means must be provided for closing the said door sections against the receptacle 94 when the said receptacle returns to bundle receiving position. The following is a description of the mechanism for accomplishing the return movement of the said door sections:—An arm 226 is fixed to the lower portion of the shaft 212 and extends approximately parallel with the plane of the door section 216. A link 227 is pivotally connected at its forward end with the outer end of the arm 226, and at its rear end is pivotally connected with the outer end of a lever 228. The inner end of the said lever 228 is fulcrumed to the rear portion of the frame A of the machine. A rod 229 is pivotally connected at its rear end with the lever 228 at a point intermediate of the ends thereof, and the forward end of the said rod 229 is pivotally connected with a swinging lever 230, which is fulcrumed at the point a, which said point is also the fulcrum point of the lever 106 heretofore described. The said lever 106 is provided with a guide for the reception of the upper end of the lever 230. The rear edge of the recess 232 is normally spaced from the rear edge of the lever 230, but when the shaft 212 rotates at the time that the door sections 225 and 216 are opened, the rod 229 moves longitudinally through the link and lever connections 227 and 228 with the arm 226 upon the shaft 212. Thus the rear edge of the swinging lever 230 is brought in contact with the rear edge of the recess 232 in the lever 106. In the meantime the shaft 90 has been continuing in its rotation, and the arm 107 carried by the said shaft 90 assumes approximately a horizontal position and forwardly disposed with relation to the said shaft 90. At this time the roller 108, journaled at the end of the arm 107, engages the forward downturned portion of the lever 106 and elevates the forward portion of the said lever. This movement on the part of the lever 106 has the effect of swinging the lower portion of the swinging lever 230 forward; thus the rod 229 is moved longitudinally in a forward direction, and the lever 228 is swung forwardly, which, through the connecting link 227, swings the arm 226 about the axis of the shaft 212 and turns the said shaft so that the door sections 216 and 225 are swung closed against the rear end of the receptacle 94. When the said door sections have been swung into closed position, as above described, the mechanism for swinging the latches 208 and 209 has been moved by the continuation of movement of the shaft 90 to such an extent as to leave the said latches free to be acted upon by the tension of the spring 211, so that the said latches will automatically engage the keepers 218 attached to the outer ends of the arms 217, and thus the said door sections are secured in closed positions.

Inasmuch as the lever 106 is operatively connected with the rods 96 which normally lie in the receptacle 94 when the same is in receiving position, when the said lever 106 assumes its normal position, the said rods or arms 96 are lowered into position in the said receptacle 94. As the arms 96 enter the said receptacle 94 the roller 127 upon the lever 99 passes below the shank portion 129 of the hook 128, and permits the said shank portion to swing rearwardly, whereby the hook at the lower end of the said member is swung out of the path of movement of the lower end of the pawl 130. Thus the rear end of the lever 109 is rendered free, and, under the pressure of the spring 117, the rod 116 is moved longitudinally in the guide 115, which in turn swings the arm 112 forwardly and partially rotates the shaft 113 which brings the gear hook 119 above described up into the path of movement of the pivoted section 121 of the arm 120; thus the said section 121 is swung out of engagement with the pin carried by the wheel 91, and the shaft 90 and its attachments come to a state of rest. At the same time the roller 87 carried by the lever 86 is actuated by the eccentric rim 133 carried by the wheel 132, so that the rear end of the said lever 86 is lowered, which moves the rod 85 out of engagement with the recess 41 of the arm 38 upon the standard shaft 36. At the same time, through the shaft 134 and the intermeshing gear wheels 132 and 135 and the connection between the said shaft 134 and the knotter shaft 138, and between the said knotter shaft and the needle arm 147, the said arm is brought to an elevated position and the twine 155 is stripped from the knotter 142 through the end of the needle 150 and is in position to be engaged by the bundles of stalks as above described.

When the arm 107 moves with the shaft 90 and the roller 108 moves with the same the said roller bears against the lower edge of the upper part of the loop 106, thus holding the loop in one position until the said roller has arrived at the point e in the loop. During this movement the shaft 90 has described practically one-quarter of a revolution and the needle above described has coöperated with the knotter, the said roller 107 then continues to the point f at the upper edge of the lower portion of the loop and forces the said loop down about the fulcrum point a thus moving the guide 102 and its connected parts. At the same time the said loop pushes back the guide 232 and permits movement of the rod 230 which is connected with the latches 208 and 209 and liberates the doors of the shock receptacle. Inasmuch as the lever 230 passes through the slot 232 in the lower portion of the loop 106, the said lever 230 is unaffected by the backward movement of the said loop 106. By the time that the roller 108 reaches the point f in the loop 106, the cord has been tied and the shock receptacle has begun its turning movement toward dumping position. By the time that the roller 108 arrives at the point g in the loop 106, the shock receptacle has assumed its dumping position and is again returning to receiving position. During the movement of the roller 108 from the point f to g the loop 106 remains substantially stationary as between said points the curvature is substantially concentric with the axis of the shaft 90. As soon as the roller 108 reaches the point g in the loop 106 it begins to raise the forward portion of the said loop and causes it to swing upon the fulcrum point a. As the forward portion of the loop 106 moves as indicated its rear portion moves the guide 102 and the parts connected thereto. At the same time the rod 202 is drawn forward and by the intermediate connection the latches 208 and 209 are liberated so that the spring 211 can thrust them down into position to catch the door at the rear of the shock receptacle when it is shut. At the same time the rear end of the slot 232 comes in contact with the lever 230 and swings the same forward and through its connections the doors of the shock receptacle are closed. When the roller 108 arrives at the position substantially as shown in Fig. 22 of the drawings the gear hook 118 engages the lower section 121 of the arm 120 and stops the shaft 90 which carries the arm 107.

What is claimed is:—

1. In a harvester a bundle receptacle, means for successively delivering bundles in horizontal position to the receptacle, means for compressing the bundles into a shock while in horizontal position in the receptacle, means for binding the shock while in horizontal position, means for turning the receptacle and opening the same to deposit the shock, and trip arms operating in the receptacle to operatively connect the receptacle turning and opening means to a source of power at the completion of the assemblage of bundles in the receptacle.

2. A harvester comprising a bundle receptacle, means for successively delivering bundles to the receptacle, means for binding the accumulation of bundles in the receptacle, trip arms operating over the receptacle and means operatively connecting the trip arms with the binding means to actuate the latter, means for swinging the trip arms out of the path of movement of the bundle receptacle, as the said receptacle assumes dumping position and means for dumping the receptacle.

3. In a harvester a tiltable bundle receptacle, means for delivering bundles successively to the bundle receptacle, a needle for binding the accumulation of bundles in the receptacle, trip arms operating over the receptacle and adapted to be moved by the accumulation of bundles, means for operatively connecting the trip arms with the needle for actuating the same, and means for swinging the trip arms beyond the path of movement of the receptacle as the receptacle assumes dumping position.

4. In a harvester a bundle receptacle, means for successively depositing bundles in the receptacle, means for compressing the assembled bundles in the receptacle, a binding needle, trip arms adapted to operate over the receptacle, means operatively connecting the trip arms with the binding needle whereby the latter is actuated as a result of the movement of the former, means for releasing the shock compressor, means for tilting the bundle receptacle and means for swinging the trip arms beyond the path of movement of the bundle receptacle as the receptacle assumes dumping position.

5. In a harvester a bundle receptacle, means for tilting said receptacle, means for successively delivering bundles to the said receptacle when the same is in receiving position, means for interrupting the delivering of the bundles when the said receptacle is in depositing position, means for binding bundles in the receptacle in the form of a shock, trip arms operating over the receptacle and adapted to be moved by the accumulation of bundles therein and means for operatively connecting said trip arms with said binding needle.

6. A harvester comprising an operating means, a stalk assembling table, a stalk barrier located at the table, a bundle casting means located at the table, means operatively connecting the stalk barrier and bundle casting means, means for actuating the bundle carrier and the bundle casting means from the operating means, a bundle assembling receptacle, means for moving the bundle receptacle to a dumping position, a hinged closure for said receptacle, catch mechanism for holding the closure in closed position, a trip arm operating over said receptacle, and means to establish active relation between the trip arm and the catch mechanism through the bundle casting means.

7. In a harvester an operating means, a stalk assembling table, a stalk barrier located at the table, bundle casting means located at the table, means operatively connecting the stalk barrier and bundle casting means, means for actuating the stalk barrier and bundle casting means from the operating means, a bundle receptacle, means for moving the bundle receptacle into dumping position, a hinged closure in closed position, trip arms operating over said receptacle, means to establish active relation between the trip arm and catch mechanism through the bundle casting means, and a shock binding mechanism arranged to operate between the stalk assembling table and bundle receptacle.

In testimony that I claim the foregoing as my own, I have hereto affixed my signature in the presence of two witnesses.

WILLIAM R. McHILL.

Witnesses:
DAVID S. McNEILL,
OLIVER ROCKHILL.

---

Copies of this patent may be obtained for five cents each, by addressing the "Commissioner of Patents, Washington, D. C."